(12) United States Patent
Yamawaki (10) Patent No.: US 8,699,077 B2
(45) Date of Patent: Apr. 15, 2014

(54) SCANNING OPTICAL APPARATUS AND IMAGE FORMING APPARATUS USING THE SAME

(75) Inventor: Takeshi Yamawaki, Tokyo (JP)

(73) Assignee: Canon Kabushiki Kaisha (JP)

( * ) Notice: Subject to any disclaimer, the term of this patent is extended or adjusted under 35 U.S.C. 154(b) by 1211 days.

(21) Appl. No.: 12/580,742

(22) Filed: Oct. 16, 2009

(65) Prior Publication Data

US 2010/0097646 A1 Apr. 22, 2010

(30) Foreign Application Priority Data

Oct. 16, 2008 (JP) ................................. 2008-267220

(51) Int. Cl.
*G06K 15/12* (2006.01)
*B41J 2/47* (2006.01)

(52) U.S. Cl.
USPC ............................. 358/1.7; 347/224; 347/225

(58) Field of Classification Search
USPC ................... 358/1.7; 347/224–231, 255–261
See application file for complete search history.

(56) References Cited

U.S. PATENT DOCUMENTS

| 6,825,870 | B2 | 11/2004 | Kato |
| 2002/0036689 | A1* | 3/2002 | Kimura .......................... 347/241 |
| 2006/0244809 | A1 | 11/2006 | Kimura |
| 2008/0212155 | A1* | 9/2008 | Shoji ............................. 359/198 |

FOREIGN PATENT DOCUMENTS

| JP | 2003-241126 A | 8/2003 |
| JP | 2006313174 A | 11/2006 |
| JP | 2007240968 A | 9/2007 |

* cited by examiner

*Primary Examiner* — Mark Zimmerman
*Assistant Examiner* — Lawrence Wills
(74) *Attorney, Agent, or Firm* — Rossi, Kimms & McDowell, LLP

(57) ABSTRACT

A scanning optical apparatus capable of forming a preferable image, includes a light source unit, a rotational polygon mirror having a plurality of deflection surfaces for deflectively scanning a light flux emerged from the light source unit, an incident optical system for imaging the light flux as a line image on the deflection surfaces; and an imaging optical system which has one or more imaging lenses, images the light flux that has passed through the rotational polygon mirror on a surface to be scanned, and brings the deflection surfaces and the surface to be scanned into a conjugate relationship with each other in a sub scanning section, in which at least one of the imaging lenses of the imaging optical system has a lens surface formed into a non-arcked shape in the sub scanning section, and is held by a holding member so as to be movable.

14 Claims, 9 Drawing Sheets

SCANNING OPTICAL APPARATUS AND IMAGE FORMING APPARATUS USING THE SAME

BACKGROUND OF THE INVENTION

1. Field of the Invention

The present invention relates to a scanning optical apparatus and an image forming apparatus using the same. For example, the present invention is particularly suitably usable in an image forming apparatus such as a laser beam printer (LBP), a digital copying machine or a multifunction printer, having an electrophotographic process.

2. Description of the Related Art

Various types of scanning optical apparatuses for a laser beam printer (LBP) having an electrophotographic process have conventionally been proposed (see Japanese Patent No. 2003-241126).

Figure 8:
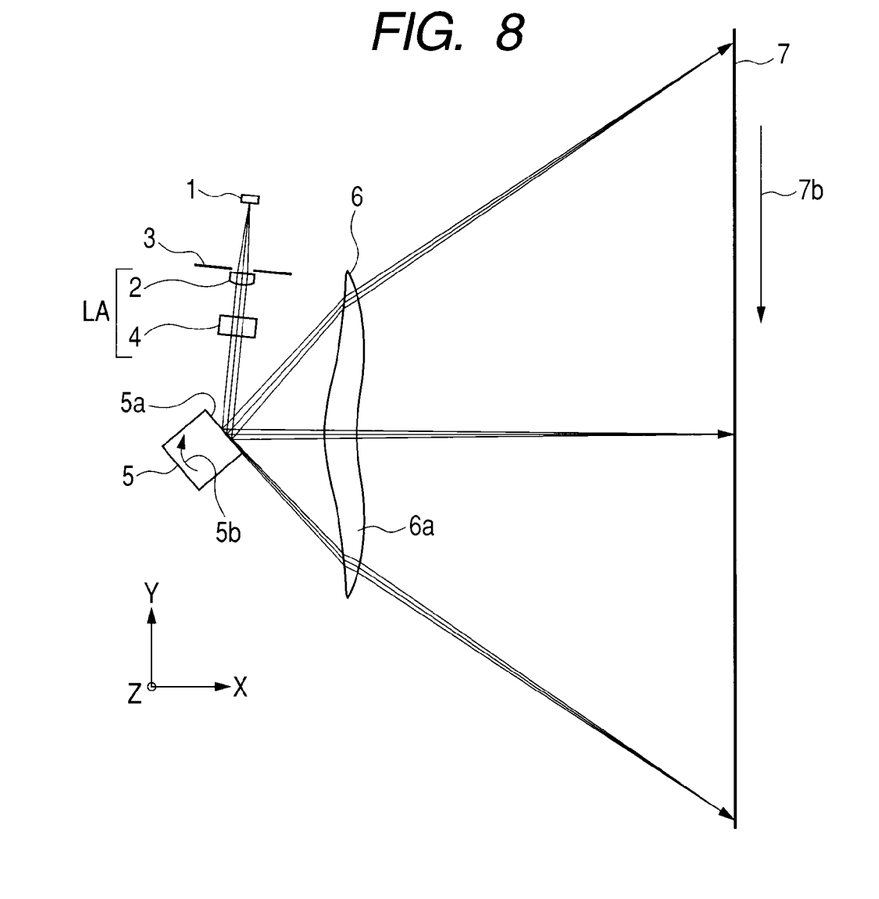
FIG. 8 is a sectional diagram of a main portion of a conventional scanning optical apparatus in a main scanning direction.
Figure 9:
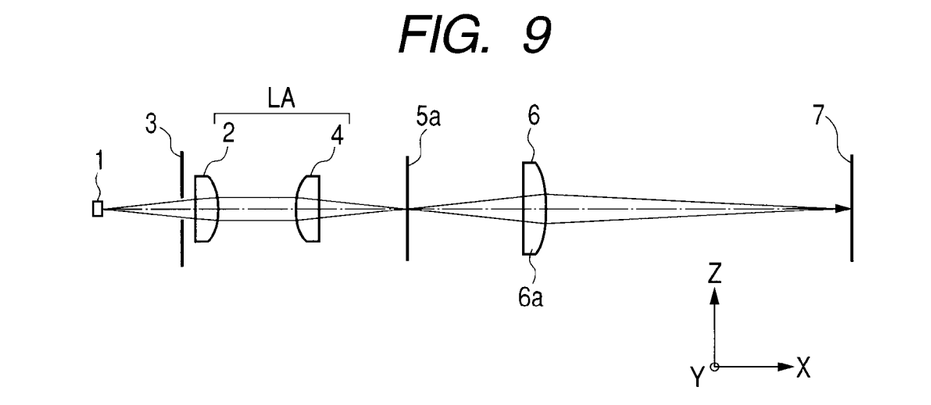
FIG. 9 is a sectional diagram of the main portion of the conventional scanning optical apparatus in a sub scanning direction.

FIG. 8 is a sectional view (main scanning sectional view) in the main scanning direction of a main portion of a conventional scanning optical apparatus, and FIG. 9 is a sectional view (sub scanning sectional view) of the main portion of FIG. 8 in the sub scanning direction.

FIGS. 8 and 9 illustrate a light source unit 1 which includes a semiconductor laser having a single light emitting portion (light emission point).

A light flux emerged from the light source unit 1 is shaped by an aperture stop 3 and is transformed into parallel light beams by means of a collimator lens 2. Then, the parallel light beams are converged by a cylindrical lens 4 only in the sub scanning direction.

The parallel light beams converged by the cylindrical lens 4 only in the sub scanning direction are then imaged into a focal line shape (line shape) extending in the main scanning direction, adjacent to a deflection surface 5a of an optical deflector (rotationed polygon mirror) 5 which is a deflection unit.

The elements of collimator lens 2 and cylindrical lens 4 described above are components of an incident optical system LA.

The parallel light beams deflectively scanned by the rotational polygon mirror 5 which is rotating at a constant angular speed in the direction of an arrow 5b in the drawing, are collected into a spot shape on a surface to be scanned 7 including a photosensitive drum, by means of an imaging lens 6a constituting an imaging optical system 6. The spot-shaped light flux scans the surface to be scanned 7 at a constant speed in the direction of an arrow 7b in the drawing.

A plurality of deflection surfaces 5a constituting the rotational polygon mirror 5 are formed at the right angle to the main scanning direction. However, due to a processing error or the like, these surfaces may have a tilt in the sub scanning direction, which causes displacement of the spot imaged on the surface to be scanned 7 in the sub scanning direction.

In order to correct such a displacement, as the imaging optical system 6, an optical face tangle error compensation system based on an anamorphic system is used, in which the vicinity of the deflection surface 5a and the surface to be scanned 7 are brought into a conjugate relationship with each other within a sub scanning section. There is known a scanning optical apparatus using such an optical face tangle error compensation system (see Japanese Patent No. 2003-21126).

In the optical face tangle error compensation system, the surface to be scanned and a plane in the vicinity of the deflection surface parallel to the surface to be scanned are brought into a conjugate relationship with each other within the sub scanning section.

However, a rotational polygon mirror has its deflection surface not placed on a rotational axis, and hence a position of the deflection surface is displaced in an optical axis direction integrally with rotational scanning.

In other words, it is only at a predetermined rotation angle of the rotational polygon mirror that the deflection surface of the rotational polygon mirror is made conjugate (coincide) with a conjugate point of the surface to be scanned. An intersection point between an incident light flux and the deflection surface is displaced in a direction away from the surface to be scanned accompanying the rotation of the rotational polygon mirror. The intersection point is most distant from the surface to be scanned at a scan center, and displaced in a direction approaching the surface to be scanned when the rotational polygon mirror further rotates.

The position of the deflection surface exhibits a quadratic function change with respect to a main scanning image height. Normally, therefore, the apparatus is designed such that a conjugate relationship is established at two points of a scanning region, i.e., at both ends. As a result, an optical face tangle error cannot be suppressed in principle in an area of the scanning region outside the area where the conjugate relationship is established.

On the other hand, attaching importance to optical face tangle error compensation performance, a conjugate relationship can be established throughout the scanning region. However, such designing causes great curvature of an imaging position of a spot of the light flux in the sub scanning direction of the surface to be scanned 7 due to an image height, which deteriorates basic performance.

Meanwhile, a conjugate relationship is uniquely determined by paraxial performance (object point position or lens focal length) of the imaging optical system. On the other hand, a best imaging position (focusing position) of a spot can be controlled to a certain extent based on a spherical aberration amount of the imaging optical system.

Paraxial performance may be determined so that the deflection surface can be made to have a conjugate relationship with portions on the surface to be scanned at all image heights, and controlling of a focusing position may be performed by using an aspherical coefficient of fourth or higher order in a surface shape of the sub scanning section of the imaging optical system.

In this manner, amounts of generated spherical aberration can be made different between the main scanning center and the end in the main scanning direction.

This way, positions of the deflection surface at all the image heights can be made coincide with each other on the surface to be scanned 7. In other words, in the position of the main scanning center, an aspherical shape is formed so that a curvature radius of a peripheral portion in the sub scanning direction of the imaging optical system can be larger than that of a central portion in the sub scanning direction.

In the end position of the main scanning direction, a curvature radius of a lens surface of the peripheral portion in the sub scanning direction of the imaging optical system is set smaller than that of the central portion in the sub scanning direction, and the lens surface is formed into an aspherical shape.

A relationship for changing the curvature radius in the sub scanning direction by the aspherical effect is as described above in the case of a scanning optical system of an under-filled type. In the case of a scanning optical system of an over-filled type, however, this relationship between the main scanning center and the main scanning end is reversed.

That is, in the position of the main scanning center, a curvature radius of a surface of the sub scanning direction peripheral portion of the imaging optical system is set smaller than a curvature radius of a surface of the sub scanning center, and the lens surface is formed into an aspherical shape. In the position of the main scanning end, a curvature radius of a surface of the sub scanning direction peripheral portion of the imaging optical system is set larger than a curvature radius of a surface of the sub scanning center, and the lens surface is formed into an aspherical shape.

Determining the aspherical shape of the surface of the imaging optical system as described above enables focusing while maintaining a conjugate relationship at all the image heights.

The following problems occur when the aforementioned designing is performed by forming the lens surface into an aspherical shape on the sub scanning section.

There is assumed a case where a manufacturing error or an assembling error of optical components constituting the imaging optical system causes a light flux made incident on the imaging optical system to be shifted in height in a vertical direction. The incident light flux passes through a position distant from an optical axis in the sub scanning section of the imaging optical system, and hence upper and lower ends of the light flux pass through positions asymmetrical from the optical axis.

That is, the upper and lower ends of the light flux are set at incident angles asymmetrical to a surface normal of a sectional shape, causing many coma aberrations. The aspherical sectional shape causes a change in curvature radius as a distance from the optical axis increases in the sub scanning direction, resulting in greater coma aberrations as compared with a case where a conventional spherical lens is used. As a consequence, a side lobe of the spot becomes larger, disabling good image formation.

SUMMARY OF THE INVENTION

It is an object of the present invention to provide a scanning optical apparatus which can effectively prevent spot shape breakage of a light flux caused by shifting of a light-ray height of the light flux made incident on an imaging optical system when a deflection surface and a surface to be scanned are brought into a conjugate relationship with each other throughout a scan range, to thereby perform good image formation.

According to an aspect of the present invention, there is provided a scanning optical apparatus including; a light source unit, a rotational polygon mirror having a plurality of deflection surfaces configured to deflectively scan a light flux emerged from the light source unit, an incident optical system configured to image the light flux emerged from the light source unit, as a line image elongated in a main scanning direction on the deflection surfaces of the rotational polygon mirror, and an imaging optical system which includes at least one imaging lens and is configured to image the light flux deflectively scanned by the rotational polygon mirror on a surface to be scanned and to bring the deflection surfaces of the rotational polygon mirror and the surface to be scanned into a conjugate relationship with each other in a sub scanning section, in which; the imaging lens has a lens surface formed into a non-arcked shape in the sub scanning section, the non-arcked shape comprises a non-arcked shape including an aspherical coefficient of fourth or higher order, and the aspherical coefficient of fourth or higher order changes in the main scanning direction of the imaging optical system from a center portion to a peripheral portion of the imaging optical system, and the imaging lens is movable in at least one of shifting in a sub scanning direction and a rotational direction around an optical axis of the imaging optical system.

Also, according to another aspect of the present invention, there is provided a scanning optical apparatus including; a light source unit, a rotational polygon mirror having a plurality of deflection surfaces configured to deflect a light flux emerged from the light source unit, an incident optical system configured to image the light flux emerged from the light source unit, as a line image elongated in a main scanning direction in the deflection surfaces of the rotational polygon mirror, and an imaging optical system configured to image the light flux deflectively scanned by the rotational polygon mirror on a surface to be scanned and to bring the deflection surfaces of the rotational polygon mirror and the surface to be scanned into a conjugate relationship with each other in a sub scanning section, in which; the imaging optical system, in an optical path between the rotational polygon mirror and the surface to be scanned, includes a first imaging lens, a mirror, and a second imaging lens in order from the rotational polygon mirror side, the second imaging lens has a lens surface formed into a non-arcked shape in the sub scanning section, the non-arcked shape comprises a non-arcked shape including an aspherical coefficient of fourth or higher order, and the aspherical coefficient of fourth or higher order changes in the main scanning direction of the imaging optical system from a center portion to a peripheral portion of the imaging optical system, and the mirror is movable around an axis parallel to the main scanning direction.

Further, according to further another aspect of the present invention, there is provided a scanning optical apparatus including; a light source unit, a rotational polygon mirror having a plurality of deflection surfaces configured to deflect a light flux emerged from the light source unit, an incident optical system configured to image the light flux emerged from the light source unit, as a line image elongated in a main scanning direction in the deflection surfaces of the rotational polygon mirror, and an imaging optical system configured to image the light flux deflectively scanned by the rotational polygon mirror on a surface to be scanned and to bring the deflection surfaces of the rotational polygon mirror and the surface to be scanned into a conjugate relationship with each other in a sub scanning section, in which the imaging optical system includes, in an optical path between the rotational polygon mirror and the surface to be scanned, a first imaging lens, a mirror, and a second imaging lens in order from the polygonal mirror side, the second imaging lens has a lens surface formed into a non-arcked shape in the sub scanning section, the non-arcked shape comprises a non-arcked shape including an aspherical coefficient of fourth or higher order, and the aspherical coefficient of fourth or higher order changes in the main scanning direction of the imaging optical system from a center portion to a peripheral portion of the imaging optical system, and the second imaging lens is rotatable around an optical axis of the imaging optical system.

In the scanning optical apparatus described above, it is preferred that the imaging lens has a rectangular shape longitudinal in the main scanning direction, and includes detection elements disposed in positions of at least two or more places separated from each other in a longitudinal direction of the imaging lens to detect a position of an incident light flux, and an adjusting mechanism capable of rotating the imaging lens around the optical axis of the imaging optical system based on output signals from the detection elements.

Alternatively, it is further preferred that the imaging lens makes a principal ray made incident on the imaging lens coincide with a meridional line of the imaging lens throughout all area of the imaging lens in the longitudinal direction.

Further, it is preferred that the above-mentioned mirror has a rectangular shape longitudinal in the main scanning direction, and the scanning optical apparatus includes detection elements disposed in positions of at least two or more places separated from each other in a longitudinal direction of the second imaging lens to detect a position of an incident light flux, and an adjusting mechanism capable of rotating the mirror around an axis parallel to the main scanning direction based on output signals from the detection elements.

Further, it is preferred that the above-mentioned second imaging lens has a rectangular shape longitudinal in the main scanning direction, and includes detection elements disposed in positions of at least two or more places separated from each other in a longitudinal direction of the second imaging lens to detect a position of an incident light flux, and an adjusting mechanism capable of rotating the second imaging lens around an optical axis of the imaging optical system based on output signals from the detection elements.

Still further, in this case, it is further preferred that the above-mentioned mirror makes a principal ray made incident on the second imaging lens coincide with a meridional line of the second imaging lens throughout all area of the second imaging lens in the longitudinal direction.

Alternatively, it is further preferred that the second imaging lens makes a principal ray made incident on the second imaging lens coincide with a meridional line of the second imaging lens throughout all area of the second imaging lens in the longitudinal direction.

According to further aspect of the present invention, there is provided an image forming apparatus including; the above-mentioned scanning optical apparatus, a photosensitive member disposed on the surface to be scanned, a developing device configured to develop an electrostatic latent image formed on the photosensitive member with a light flux scanned by the scanning optical apparatus, as a toner image, a transferring device configured to transfer the developed toner image to a transfer material, and a fixing device configured to fix the transferred toner image on the transfer material.

Alternatively, according to further aspect of the present invention, an image forming apparatus may include; the above-mentioned scanning optical apparatus, and a print controller configured to convert code data supplied from an external device, into an image signal and to input the image signal to the scanning optical apparatus.

According to the present invention, a scanning optical apparatus is obtained, which can effectively prevent spot shape breakage of a light flux caused by shifting of a light-ray height of the light flux made incident on the imaging optical system when the deflection surface and the surface to be scanned are brought into a conjugate relationship with each other throughout the scan range, to thereby perform good image formation.

Further features of the present invention will become apparent from the following description of exemplary embodiments with reference to the attached drawings.

DESCRIPTION OF THE EMBODIMENTS

[First Embodiment]

Figure 1:
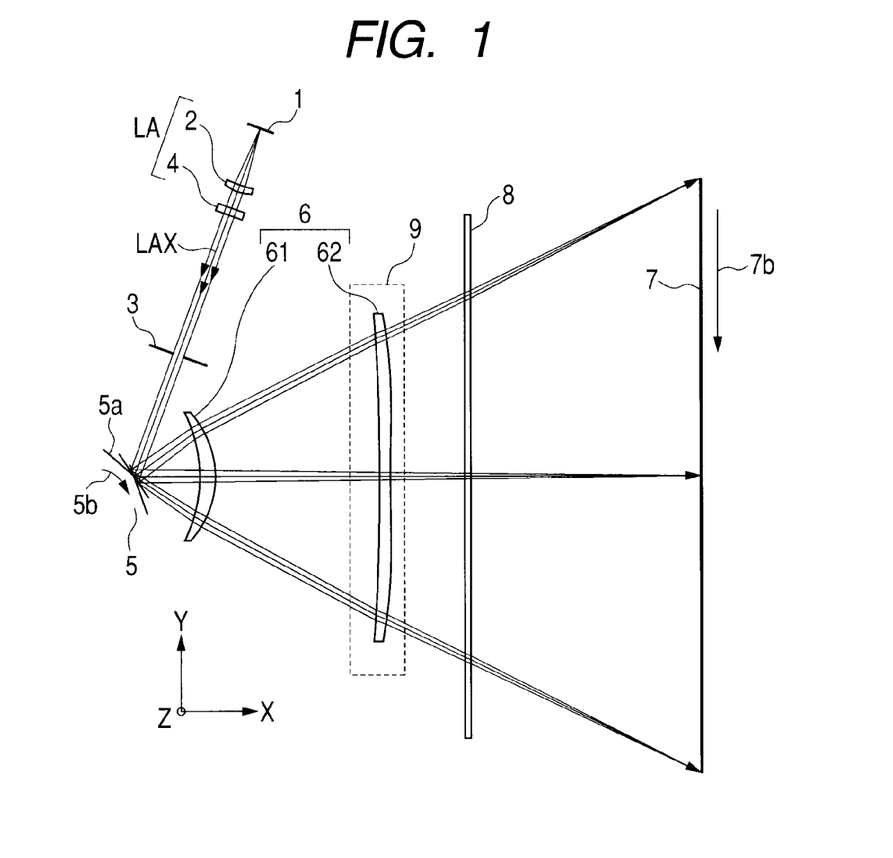
FIG. 1 is a sectional diagram illustrating a main portion of a scanning optical apparatus in a main scanning direction according to a first embodiment of the present invention.

FIG. 1 is a sectional view (main scanning sectional view) illustrating a main portion of an scanning optical apparatus in the main scanning direction according to a first embodiment of the present invention.

In the following description, the main scanning direction (Y direction) refers to a direction perpendicular to the rotation axis of the deflection unit and the optical axis of the imaging optical system (X direction) (a direction in which a light flux is deflectively scanned by the deflection unit). The sub scanning direction (Z direction) refers to a direction which is parallel to the rotational axis of the deflection unit. The main scanning section refers to a plane containing the optical axis of the imaging optical system and the main scanning direction. The sub scanning section refers to a plane containing the optical axis of the imaging optical system and perpendicular to the main scanning section.

In FIG. 1, the light source unit 1 includes a semiconductor laser constituted by a single or a plurality of light emitting portions (light emission points).

A light flux emerged from the light source unit 1 is converted into parallel light beams by a collimator lens which is a first optical element. Thereafter, the parallel light beams are converged by a cylindrical lens 4 which is a second optical element, only in the sub scanning direction.

Though the first optical element 2 in this embodiment converts the state of an incident light flux into parallel light beams, the present invention is not limited thereto. It may convert the incident light flux into a diverged light flux having slower divergence or a converged light flux.

The light flux having been converged only in the sub scanning direction by the cylindrical lens 4 passes through an aperture stop 3, by which the sectional shape thereof is adjusted. Then, the light flux is imaged into a focal line shape (line shape) extending in the main scanning direction, in the vicinity of the deflection surface 5a of the optical deflector (rotational polygon mirror) 5 which is a deflection unit.

The elements of collimator lens 2 and cylindrical lens 4 described above are components of an incident optical system LA as the first optical system.

The optical axis LAX of the incident optical system LA is disposed to have a predetermined incident angle (e.g., 2.5°) in the sub scanning direction, relative to a plane perpendicular to the deflection axis of the deflection surface 5a of the optical deflector 5. The incident optical system functions to direct a light flux emerged from the light source unit 1 to the deflection surface 5a of the optical deflector 5.

In the first embodiment, the scanning optical apparatus includes a scanning optical apparatus of an under-filled type in which, the light flux from the incident optical system LA is made incident within the main scanning section, on the deflection surface 5a of the optical deflector 5 with a light flux width narrower than a width of the deflection surface 5a.

The optical deflector 5 rotates at a constant angular speed in an arrow direction 5b in the drawing. The light flux deflected by the deflection surface 5a of the optical deflector 5 enters an imaging optical system 6 as a second optical system which includes two lenses, namely, first and second imaging lenses (imaging optical elements) and 62. The imaging optical system 6 collects the incident light flux in a spot shape on a surface to be scanned (photosensitive drum surface) 7. Then, the surface to be scanned 7 is scanned by the light flux collected in the spot shape by rotating the optical deflector 5 at a constant speed in an arrow direction 7b in the drawing.

Hereinafter, the image focusing lens 61 is referred to as "first imaging lens 61", and the image focusing lens 62 is referred to as "second imaging lens 62".

A dustproof glass 8 is provided to prevent dust particles or toner particle from entering into the scanning optical apparatus.

It should be noted that in FIG. 1, with regard to the optical deflector 5, only the deflection surface 5a thereof is illustrated.

Here, within the main scanning section, the imaging optical system 6 functions to image the parallel light beams deflectively scanned by the deflection surface 5a of the optical deflector 5, into a spot shape on the surface to be scanned 7.

Further, within the sub scanning section, the imaging optical system 6 functions to bring the surface to be scanned 7 and the imaging position (focal line position) imaged on the deflection surface 5a by the cylindrical lens 4, into a conjugate relationship with each other, thereby to provide a so-called optical face tangle error compensation system.

Table 1 and Table 2 below show numerical examples of each of the optical elements and the imaging optical system 6 in the present embodiment.

Now, the point of intersection of each lens surface with the optical axis is taken as an origin, the optical axis direction is taken as an X axis, an axis orthogonal to the optical axis within the main scanning section is taken as a Y axis, and an axis orthogonal to the optical axis within the sub scanning section is taken as a Z axis. Then, the aspherical shape in the main scanning section of the lens surfaces of the first and second imaging lenses 61 and 62, constituting the imaging optical system 6 can be expressed by the following equation.

$$x = \frac{y^2/R}{1+(1-(1+k)(y/R)^2)^{1/2}} + \sum_{i=4}^{16} B_i y^i \qquad <\text{Equation 1}>$$

where R is the paraxial curvature radius, k is the eccentricity, and $B_4$ to $B_{16}$ are aspherical coefficients.

If the coefficient is different between the plus side of Y-coordinate (upper side in FIG. 1) and the minus side thereof (lower side in FIG. 1), a subscript u is attached to the coefficient on the plus side while a subscript l is attached to the coefficient on the minus side.

The shape in the sub scanning section of both of the lens surfaces of the first imaging lens 61 and the surface of the second imaging lens 62 on the optical deflector 5 side is an arcked shape having a curvature radius r in the sub scanning section.

The shape in the sub scanning section of the lens surface of the second image focusing lens 62 on the surface to be scanned 7 side is aspherical surface shape (non-arcked shape) including a fourth order term, and it can be expressed as follows.

$$x = \frac{z^2/r'}{1+(1-(1+k_z)(z/r')^2)^{1/2}} + \sum_{j=0}^{10} E_j y^j z^4 + \sum_{k=0}^{10} F_k y^k z^6 + \sum_{l=0}^{10} G_l y^l z^8 + \ldots \qquad <\text{Equation 2}>$$

where $k_z$ is the eccentricity.

Here, the curvature radius r' in the sub scanning section changes continuously with the Y-coordinate of the lens surface, and it is expressed as follows.

$$\frac{1}{r'} = \frac{1}{r} + \sum_{j=2}^{10} D_j y^j \qquad <\text{Equation 3}>$$

where r is the curvature radius on the optical axis in the sub scanning section, and $D_2$ to $D_{10}$ are coefficients of variation of the curvature radius in the sub scanning section.

If the coefficient is different between the plus side of Y-coordinate (upper side in FIG. 1) and the minus side thereof (lower side in FIG. 1), a subscript u is attached to the coefficient on the plus side while a subscript l is attached to the coefficient on the minus side.

Further, the forth-order aspherical coefficient $E_j y^j$ of the sub scanning section changes continuously with the Y-coordinate of the lens surface, and the shape can be represented by the tenth function of Y.

Here, in Table 2, "E-x" means "$10^{-x}$".

It should be noted that, though in the first embodiment, the aspherical coefficient $F_k y^k$ and $G_l y^l$ of sixth or higher order is zeroth order, they may have a finite value.

TABLE 1

| Used Reference Wavelength | λ | nm | 790 |
|---|---|---|---|
| No. of Light Emission Points | n | | 1 |

TABLE 1-continued

| | | | |
|---|---|---|---|
| Semiconductor Laser Cover Glass Thickness | dcg | mm | 0.25000 |
| Semiconductor Laser Cover Glass Refractive Index | n0 | | 1.51052 |
| Light Emission Point to Collimator Lens 1st Surface | d0 | mm | 23.35000 |
| Collimator Lens 1st Surface Curvature Radius | R1 | mm | ∞ |
| Collimator Lens Thickness | d1 | mm | 3.00000 |
| Collimator Lens Refractive Index | n1 | | 1.76167 |
| Collimator Lens 2nd Surface Curvature Radius | R2 | mm | −19.04573 |
| Collimator Lens 1st Surface to Cylindrical Lens 1st Surface | d2 | mm | 6.36756 |
| Sub scanning Direction Curvature Radius of Cylindrical Lens 1st Surface | Rs3 | mm | 57.44000 |
| Main-Scan Direction Curvature Radius of Cylindrical Lens 1st Surface | Rm3 | mm | ∞ |
| Cylindrical Lens Thickness | d3 | mm | 3.00000 |
| Cylindrical Lens Refractive Index | n3 | | 1.52397 |
| Cylindrical Lens 2nd Surface Curvature Radius | R4 | mm | ∞ |
| Cylindrical Lens 2nd Surface to Aperture Stop | d4 | mm | 58.37199 |
| Aperture Stop to Polygon Deflecting Reflection Surface | d5 | mm | 50.04763 |
| Polygon Deflecting Reflection Surface 1st f-θ Lens 1st Surface | d6 | mm | 26.00000 |
| 1st f-θ Lens Thickness | d7 | mm | 6.00000 |
| 1st f-θ Lens Refractive Index | n7 | | 1.52397 |
| 1st f-θ Lens 2nd Surface to 2nd f-θ Lens 1st Surface | d8 | mm | 63.00000 |
| 2nd f-θ Lens Thickness | d9 | mm | 4.00000 |
| 2nd f-θ Lens Refractive Index | n9 | | 1.52397 |
| 2nd f-θ Lend 2nd Surface to Surface to be scanned | d10 | mm | 121.05695 |
| Dust-Proof Glass Thickness | t | mm | 2.00000 |
| Dust-Proof Glass Refractive Index | n10 | | 1.51052 |
| Incident optical system Polygon Incident Angle | γ | degree | 70.00000 |
| Largest Effective Light Ray Scan Angle | η | degree | 35.04795 |
| Polygon Circumscribed Circle Radius | r | mm | 20.00000 |
| No. of Polygon Surfaces | men | | 6 |
| Stop Diameter | | φM × φS (ellipse) mm | 4.3 × 1.16 |

TABLE 2 f-θ Lens Shape

| | 1st Surface | | 2nd Surface |
|---|---|---|---|
| | 1st f-θ Lens | | |
| R | −47.79289 | R | −32.09907 |
| k | −9.38333E+00 | k | −3.33606E−01 |
| B4 | −1.15068E−05 | B4u | −3.74078E−07 |
| B6 | 3.22676E−08 | B6u | 5.46865E−09 |
| B8 | −4.48458E−11 | B8u | 1.22723E−11 |
| B10 | 1.06619E−14 | B10u | −2.96445E−14 |
| | | B41 | −4.14872E−07 |
| | | B61 | 5.81255E−09 |
| | | B81 | 1.12110E−11 |
| | | B101 | −2.85520E−14 |
| r | 1000.00000 | r | 1000.00000 |
| | 2nd f-θ Lens | | |
| R | −765.98920 | R | 1076.42309 |
| k | 0.00000E+00 | k | 1.68784E+02 |
| B4 | 0.00000E+00 | B4 | −4.25177E−07 |
| B6 | 0.00000E+00 | B6 | 3.04655E−11 |
| B8 | 0.00000E+00 | B8 | −1.40942E−15 |
| B10 | 0.00000E+00 | B10 | 4.12580E−20 |
| r | 198.08300 | r | −32.21895 |
| | | kz | 0.00000E+00 |
| | | D2u | 3.49149E−06 |
| | | D4u | −1.13089E−09 |
| | | D6u | 2.61250E−13 |
| | | D8u | −2.55242E−17 |
| | | D10u | 0.00000E+00 |
| | | D21 | 3.14508E−06 |
| | | D41 | −6.72921E−10 |
| | | D61 | 7.79794E−14 |
| | | D81 | −2.68999E−19 |
| | | D101 | 0.00000E+00 |
| | | E0 | 4.04813E−05 |
| | | E1 | 1.88164E−08 |
| | | E2 | −3.80934E−08 |
| | | E3 | −2.16279E−10 |
| | | E4 | 6.61635E−12 |
| | | E5 | 3.05708E−13 |
| | | E6 | −1.98246E−16 |
| | | E7 | −1.22612E−16 |
| | | E8 | −2.13308E−20 |
| | | E9 | 1.65626E−20 |
| | | E10 | −2.28763E−23 |

As described above, in the optical face tangle error compensation system, the surface to be scanned and the plane in the vicinity of the deflection surfaces parallel to the surface to be scanned are brought into the conjugate relationship with each other in the sub scanning section. However, the deflecting surfaces of the rotational polygon mirror are not located on the rotational axis, and hence the positions of the deflection surfaces are displaced in the optical axis direction integrally with rotational scanning.

As a result, an optical face tangle error cannot be suppressed in principle in an area of the scanning region outside the area where the conjugate relationship is established.

FIGS. 10A to 10E each schematically illustrate this state.

Figure 10A:
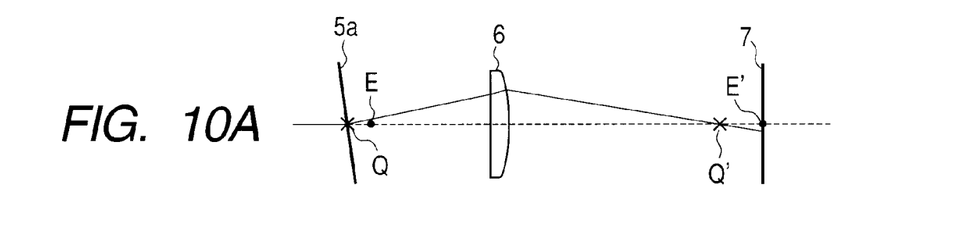
FIGS. 10A, 10B, 10C, 10D and 10E each illustrate an optical face tangle error compensation system of a sagittal spherical surface.
Figure 10B:
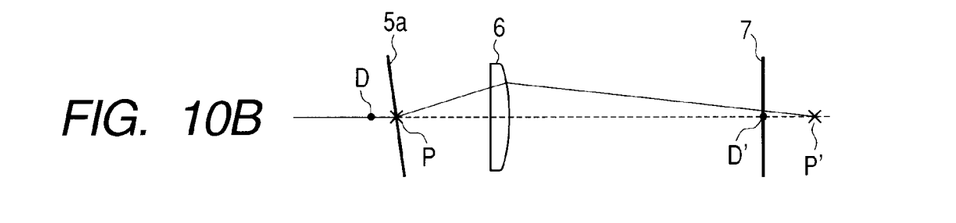
Figure 10C:
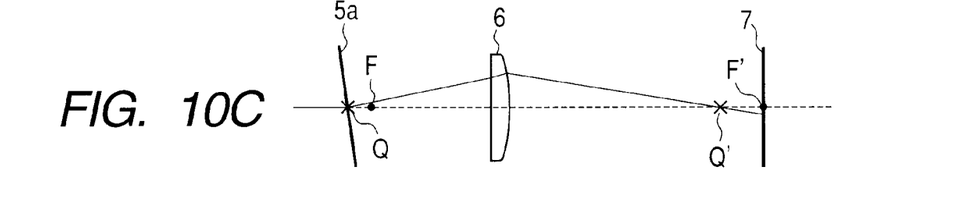

FIGS. 10A to 10E each illustrate a conjugate relationship established between the deflection surface 5a and the surface to be scanned 7 within the sub scanning section by the imaging optical system 6. FIGS. 10A and 10C each illustrate a state of the deflection surface 5a in a scanning end portion in the main scanning direction, and FIG. 10B illustrates a state of the deflection surface 5a in a scanning center portion in the main scanning direction.

Figure 10D:
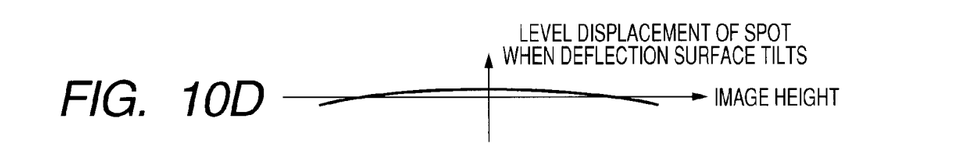

FIG. 10D illustrates a position of a spot (image height) in the main scanning direction on an image surface on an abscissa and height shifting of a spot when an optical face tangle error occurs on an ordinate.

Figure 10E:
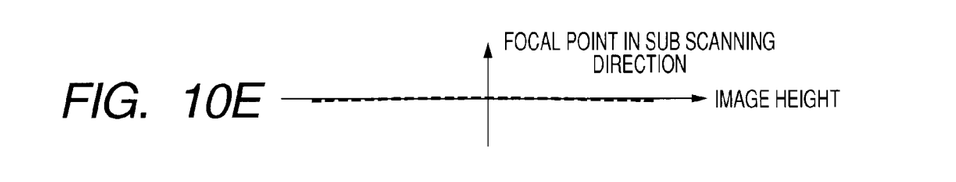

FIG. 10E illustrates a position of a spot (image height) in the main scanning direction on an image surface on an abscissa and a focusing position in a sub scanning direction on an ordinate.

FIGS. 10A to 10E each illustrate the deflection surface 5a, the imaging optical system 6, and the surface to be scanned 7.

P' and Q' are conjugate points of points P and Q of the deflection surface 5a by the imaging optical system 6. D', E', and F' are imaging positions of focal line positions D, E, and F of the incident optical system LA imaged in the vicinity of the deflection surface 5a by the imaging optical system 6.

Namely, the imaging positions indicate focusing positions within the sub scanning section. Displacement of the deflection surface 5a is sequentially illustrated in FIGS. 10A to 10C in this order, and hence the conjugate points traverse the surface to be scanned 7, and image heights in complete conjugation in which a surface tilt is are at two ends of the main scanning direction as illustrated in FIG. 10D.

In this case, importance is attached to focusing in the sub scanning direction. A focal line of the incident optical system LA is accordingly designed to be positioned in the displacement of the deflection surface 5a and to be made conjugate with the image surface. Thus, as illustrated in FIG. 10E, defocusing in the sub scanning direction is substantially 0 at any image height.

A conjugate relationship can be established throughout the scanning region by attaching importance to optical face tangle error compensation performance. However, with such designing, a spot imaging position of the light flux in the scanning direction on the surface to be scanned 7 is greatly curved by an image height, which deteriorates basic performance.

FIGS. 11A to 11E each schematically illustrate this state. In FIGS. 11A to 11E, components similar to those of FIGS. 10A to 10E are denoted by the same reference symbols.

Figure 11A:
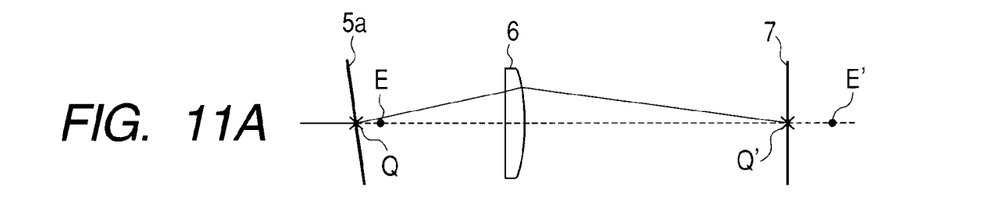
FIGS. 11A, 11B, 11C, 11D and 11E each illustrate a optical face tangle error compensation system of a sagittal aspherical surface.
Figure 11B:
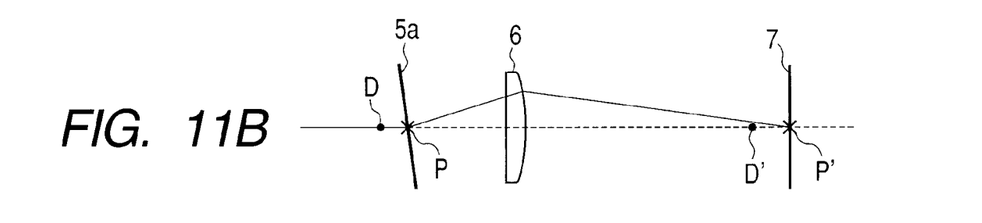
Figure 11C:
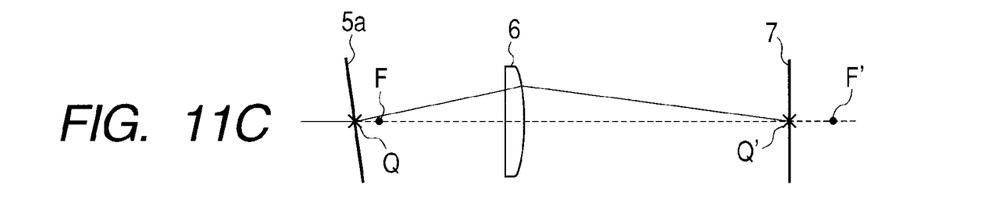

In FIGS. 11A to 11C, it is assumed that the points P and Q on the deflection surface 5a moved following rotational scanning of the rotational polygon mirror 5 are designed to be always imaged as points P' and Q' on the surface to be scanned 7 by the imaging optical system 6. In this case, the imaging positions of the focal lines D, E, and F of the incident optical system LA are shifted on the surface to be scanned 7 as indicated by the points D', E', and F' by the imaging optical system 6, which causes focus fluctuation.

Figure 11D:
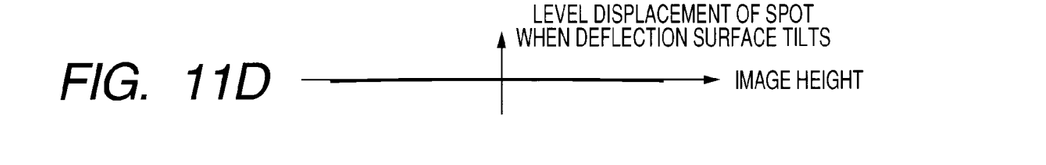
Figure 11E:
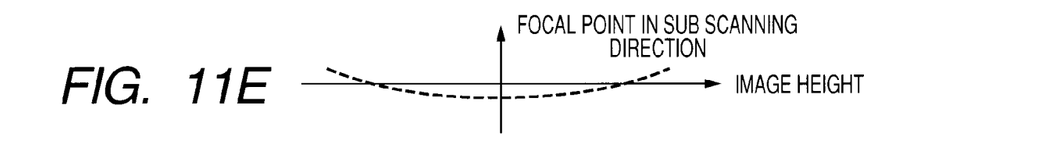

FIGS. 11D and 11E are graphs each illustrating this state. Spot imaging performance is basic performance. Degraded basic performance means designing with reduced optical performance. This designing is permissible when a depth width of the designing is sufficiently large.

Determining the non-arcked shape (aspherical shape) of the lens surface of the imaging optical system this way enables focusing while maintaining a conjugate relationship at all the image heights.

However, when the aforementioned designing is employed by forming the lens surface into a non-arcked shape within the sub scanning section, coma aberrations become greater as compared with a case where the conventional spherical lens is used, and a side lobe of the spot is enlarged, disabling good image formation.

FIGS. 12A to 12E each illustrate a spot shape when an incident light flux position having a width of 2.5 mm is changed in the sub scanning direction in the imaging lens including a non-arcked lens surface in the sub scanning section. In each spot, a vertical direction indicates a sub scanning direction, and a lateral direction indicates a main scanning direction.

A spot shape is represented by a contour line based on a slice section of a peak light quantity. Slice levels are 37%, 13.5%, 10%, 7%, 5%, and 2%.

Figures 12A, 12B:
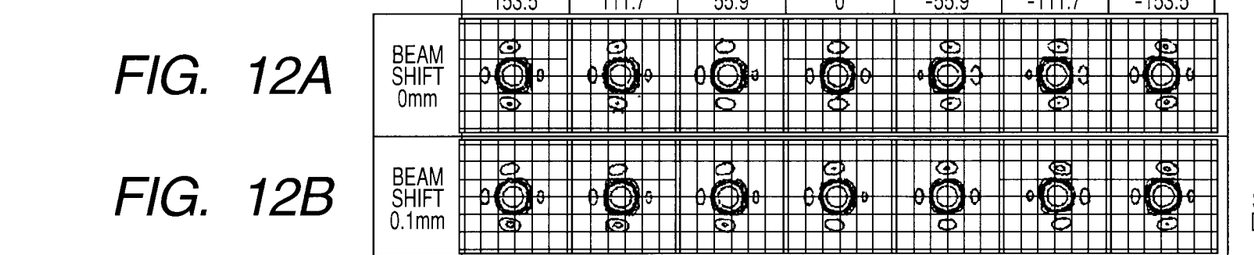
FIGS. 12A, 12B, 12C, 12D and 12E each illustrate a relationship between light-ray height shifting and a spot of an imaging lens.
Figure 12C:
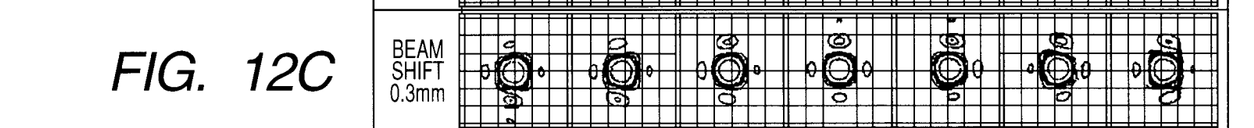
Figure 12D:
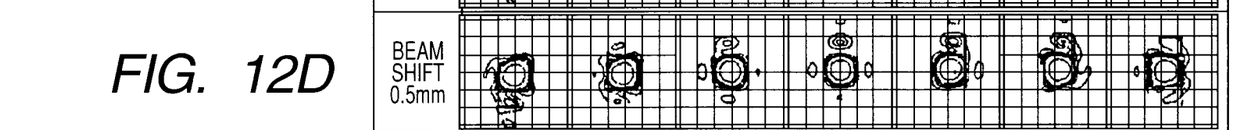
Figure 12E:
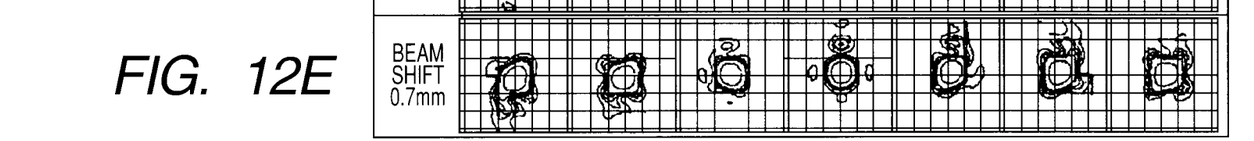

In FIG. 12A, a design value of a light ray incident height is 0 mm from the optical axis: 0.1 mm in FIG. 12B; 0.3 mm in FIG. 12C; 0.5 mm in FIG. 12D; and 0.7 mm in FIG. 12E, respectively.

In each of the drawings, a lateral direction indicates a change in spot shape at an image height position in the main scanning direction, and image heights are 153.5 mm, 111.7 mm, 55.9 mm, 0 mm, −55.9 mm, −111.7 mm, and −153.5 mm from a left end. The left end indicates an image height on a side where a laser light source of the incident optical system emits a laser beam to the deflection surface. In the drawings, when a height of the incident light ray is increased, deterioration of the spot shape becomes conspicuous at image heights of both ends, as illustrated from FIGS. 12A to 12E. When the height exceeds 0.5 mm, the spot shape exhibits drastic deterioration.

In this embodiment, at least one imaging lens 62 of the imaging optical system 6 is in a rectangular shape and has its lens surface formed into a non-arcked shape (aspherical shape) in the sub scanning section.

The non-arcked shape is constituted of a non-arcked shape including an aspherical coefficient of fourth or higher order. The aspherical coefficient of fourth or higher order changes from a center portion to a peripheral portion of the imaging optical system in the main scanning direction of the imaging optical system.

At least one imaging lens is held by a holding member so as to be movable in at least one of a shifting direction (height adjustment in the sub scanning direction) and a rotational direction around the optical axis.

Figure 2:
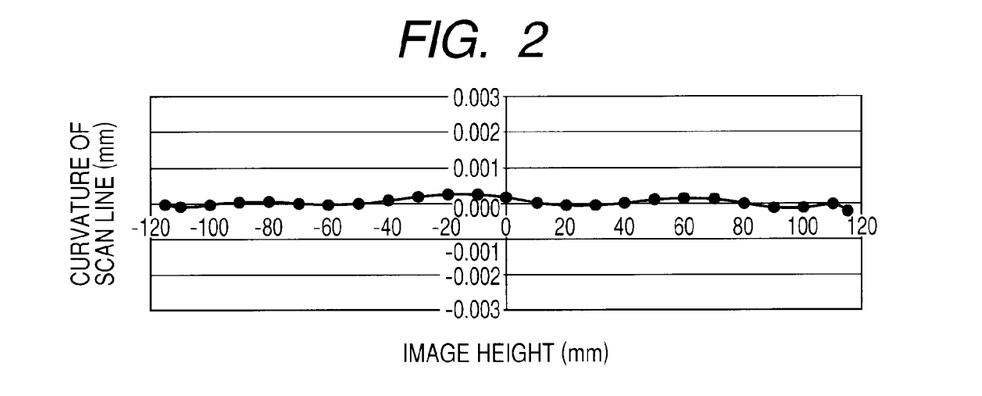
FIG. 2 illustrates a scan-line curve due to an optical face tangle error in the first embodiment of the present invention.

FIG. 2 illustrates a scanning line curve on the surface to be scanned 7 in the embodiment caused by a surface tilt in a case where the deflection surface 5a has a tangle error 5' which is upward in the sub scanning direction due to a processing error.

Figure 3:
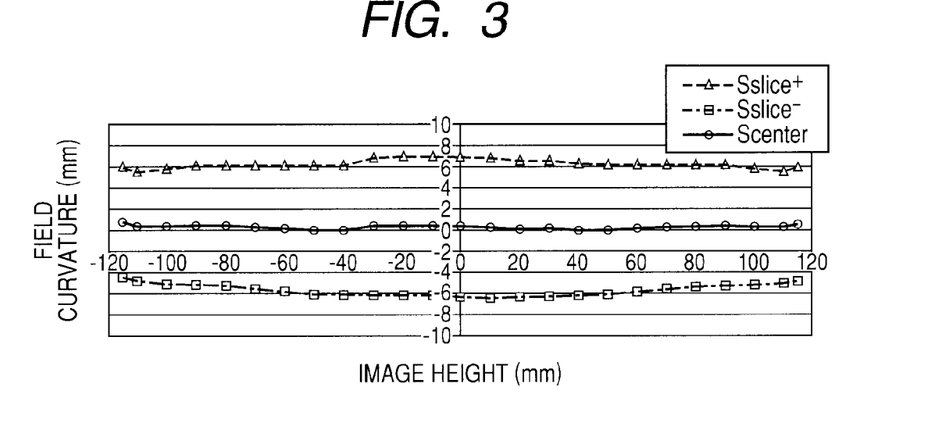
FIG. 3 illustrates a field curvature in a sub scanning direction in the first embodiment of the present invention.

FIG. 3 illustrates a field curvature in the sub scanning direction in this embodiment.

In FIG. 3, "Sslice+" denotes a plus side defocusing position where a spot diameter in the sub scanning direction becomes 85 μm or less. Similarly, "Sslice−" denotes a minus side defocusing position where the spot diameter in the sub scanning direction becomes 85 μm or less. Further, "Scepter" denotes the intermediate defocusing position between "Sslice+" and "Sslice-".

In this embodiment, an amount of the scanning line curve due to the surface tilt when a tangle error of 5' of the deflection surface 5a which is upward in the sub scanning direction is caused by a processing error, can be kept at 0.3 μm or less throughout the effective scanning region (±115 mm). Thus, good performance is realized.

Further, the field curvature in the sub scanning direction is P-P (Peak to Peak) 0.7 mm, and thus good optical performance is satisfied as well.

Next, a position adjusting method of the imaging lens in the embodiment of FIG. 1 is described.

In this embodiment, detection elements 18 and 19 for detecting a position of an incident light flux are disposed in positions of at least two or more places separated from each other in the longitudinal direction of the imaging lens 62.

The position of the imaging lens 62 is adjusted based on output signals from the detection elements.

The imaging lens 62 is adjusted so that a principle light ray incident on the imaging lens coincides with the meridional line of the imaging lens 62 throughout all the area of the imaging lens 62 in the longitudinal direction.

In FIG. 1, a portion 9 enclosed by a broken line is an area held by the holding member to be adjusted. In this embodiment, the second imaging lens 62 is movable.

Figure 4:
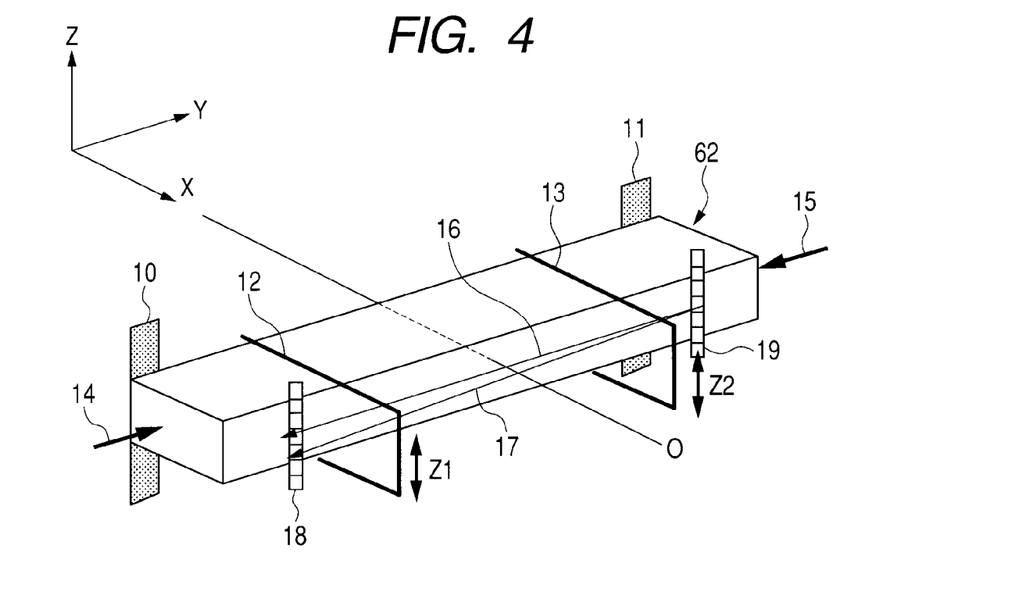
FIG. 4 illustrates an adjusting mechanism in the first embodiment of the present invention.

FIG. 4 is a schematic block diagram of the second imaging lens 62, illustrating an adjusting mechanism (adjusting unit) for adjusting a posture of the second imaging lens 62.

The adjusting mechanism for adjusting the posture of the second imaging lens 62 is incorporated into an adjusting tool (not shown) for holding an optical box, and includes first holding units (holding members) 12 and 13, second holding units (holding members) 14 and 15, and line sensors (detection elements) 18 and 19, which are illustrated in FIG. 4.

A coordinate system is designed such that a direction of an optical axis O is an X axis, a longitudinal direction of the second imaging lens 62 is a Y axis, and an axis orthogonal to the X and Y axes is a Z axis, as illustrated in FIG. 4. In FIG. 4, X reference surfaces 10 and 11 set in the optical box to determine an X-axis direction position of the second imaging lens 62 are constituted of, for example, ribs or the like of the optical box.

The second imaging lens 62 is held in a state where two places separated from each other in the Y axis direction are held by the first holding members 12 and 13 to be abutted on the X reference surfaces 10 and 11. Each of the first holding members 12 and 13 includes a mechanism capable of independently adjusting the second imaging lens 62 in the Z axis direction, and the posture of the second imaging lens 62 is adjusted in a direction for rotating around the X axis or shifting (moving) in the Z axis direction.

The lens surface of the second imaging lens 62 is scanned with light rays 16 and 17.

The light ray 16 is a light ray (a reference scanning light) for scanning the near center of the imaging lens 62 in a state corresponding to a design value.

The posture of the second imaging lens 62 of FIG. 4 indicates a reference state corresponding to the reference scanning light 16 of the design value.

The second imaging lens 62 is adjusted based on this reference state.

The light ray 17 indicates a state of a light ray (tilt scanning light) for scanning the lens surface of the second imaging lens 62 in a tilting manner due to a processing error or an assembling error of the optical components.

For example, the optical deflector is set in such a state when the rotary axis is assembled to tilt. In this case, the first and second holding members 12 and 13 are adjusted in the Z axis direction to perform adjustment so that relative positions of the second imaging lens 62 and the tilt scanning light 17 can be in the states corresponding to the design values.

In order to facilitate the adjustment of the first holding members 12 and 13, the adjusting tool includes the line sensors (detection elements) 18 and 19 each having a plurality of pixels arrayed in the Z axis direction, integrally in the first and second holding members 12 and 13.

Holding the second imaging lens 62 by the first holding members 12 and 13 enables determination of relative positions of the pixels of the line sensors 18 and 19 arrayed in the Z axis direction with respect to the second imaging lens 62.

Storing a pixel passed by the reference scanning light 16 passing through the center of the second imaging lens 62 as an original point in the position of the reference state, and adjusting the first holding members 12 and 13 so that the tilt scanning light 17 passes through the original point of the line sensors 17 and 18 enable easy, quantitative, and highly accurate adjustment.

After the adjustment of the second imaging lens 62, the second imaging lens 62 is fixed on the X reference surfaces 10 and 11 of the optical box through UV adhesion or the like.

Adjustment accuracy needs to be equal to or less than ⅕ of a light flux diameter in the lens passing position. In this embodiment, pixel pitches of the line sensors 18 and 19 are about 7 µm, providing sufficient resolution. Position accuracy of the first holding members 12 and 13 and the second imaging lens 62 is equal to or less than 0.05 mm, achieving target adjustment accuracy. More preferably, adjustment may be further made to attain the position accuracy of 0.1 mm or less enables a state to be maintained, as illustrated in FIGS. 12A to 12E, where spot deterioration is further suppressed.

Figure 5:
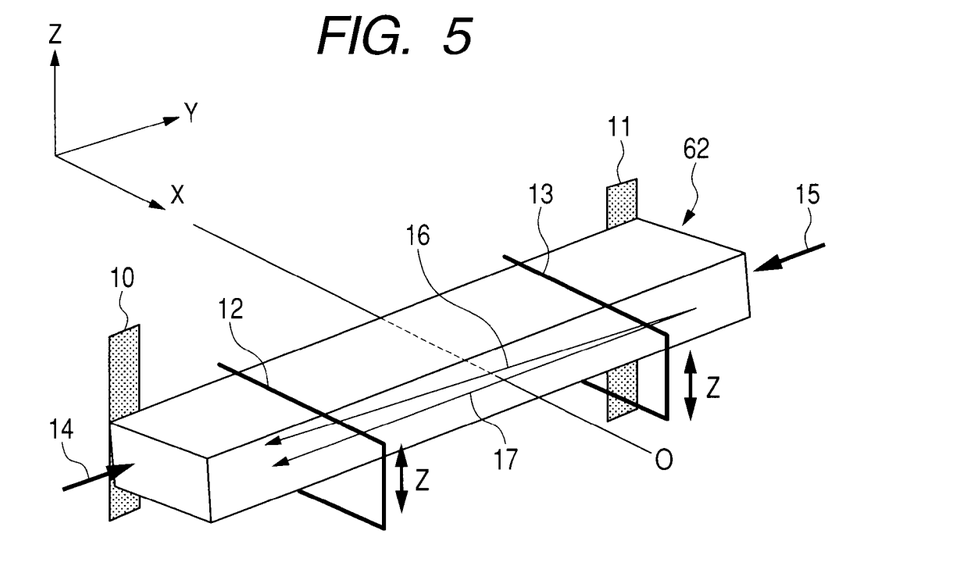
FIG. 5 illustrates the adjusting mechanism in the first embodiment of the present invention.

FIG. 5 illustrates an adjusted state of the second imaging lens 62 with respect to the tilt scanning light 17.

The tilt example of tilt scanning light 17 on the second imaging lens 62 has been described. Even when a height of the scanning light on the imaging lens is simply changed (e.g., tilt of the mirror M1 of FIG. 6 within a paper surface of FIG. 6), the first holding members 12 and 13 only need to be adjusted similarly by the aforementioned adjusting method, enabling suppression of spot deterioration of the light flux.

The adjusting mechanism includes second holding members 14 and 15 for holding both ends of the second imaging lens 62 in the Y axis direction, and adjusts a position of the second imaging lens 62 in the Y axis direction.

The second holding members 14 and 15 constitute a mechanism for adjusting the second imaging lens 62 in the Y axis direction to adjust uneven magnification. The uneven magnification means symmetry in a scanning period of time between an upstream side and a downstream side of an image center of a light for scanning the surface to be scanned 7. Adjustment this way can balance extension of an image with respect to the image center by optical performance, providing a good-quality image.

Figure 6:
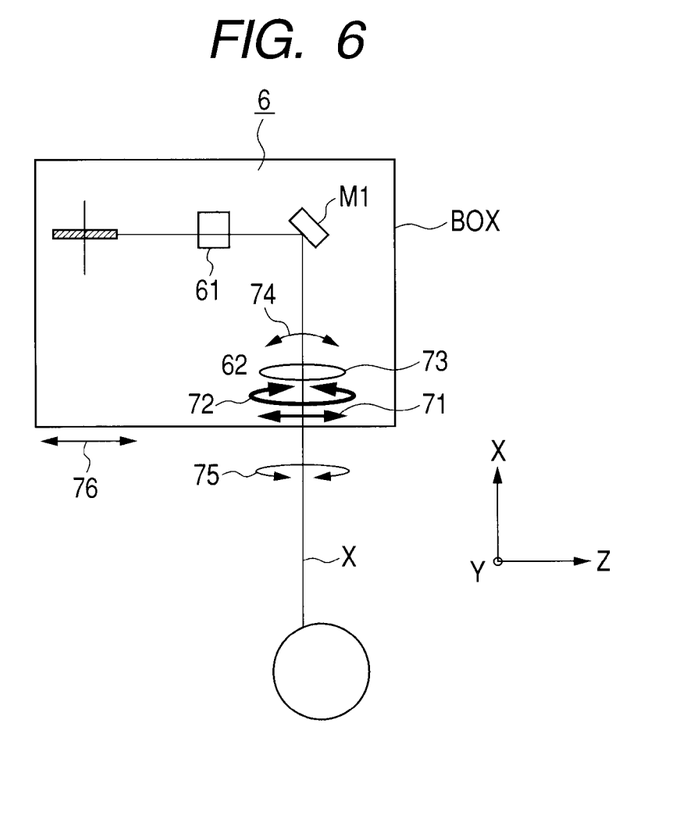
FIG. 6 illustrates an adjusting mechanism in the scanning optical apparatus according to the first embodiment of the present invention.

FIG. 6 illustrates a configuration of an adjusting place in the scanning optical system of the scanning optical apparatus.

In FIG. 6, a posture adjusting mechanism G2dZ 71 and a posture adjusting mechanism G2Rx 72 perform posture adjustment by the first holding members 12 and 13 of the second imaging lens 62 described above with reference to FIG. 4. A Y-direction position adjusting mechanism G2dY 73 is a Y-direction position adjusting mechanism by the second holding members 14 and 15 of FIG. 4, and adjusts uneven magnification. A scanning line curve adjusting mechanism G2Ry 74 rotates the second imaging lens 62 around the Y axis to adjust a scanning line curve. A scanning line tilt adjusting mechanism LSURx 75 rotates the entire optical box BOX around the optical axis X to adjust a scanning line tilt. An illumination position height adjusting mechanism LSUdZ 76 shifts the entire optical box BOX in the Z direction to adjust an illumination position height.

The spot deterioration of the light flux on the surface to be scanned 7 is solved by adjustments performed by the adjusting mechanisms 71 and 72. Increasing a percentage of completion as the scanning optical apparatus, and disposing mechanisms for adjusting an uneven magnification, a scanning line curve, a scanning line tilt, and an illumination position, and the like enables reduction in deterioration of optical performance generated in assembling or component accuracy, to thereby provide a good image.

In particular, in the case of a color scanning optical apparatus, a scanning line curve and a tilt cause color shifting, and hence such an adjusting mechanism is essential.

As described above, in this embodiment, breakage of a spot shape of a light flux is effectively suppressed, which is caused by shifting of a ray height of the light flux incident on the imaging optical system when the deflection surface and the surface to be scanned are made conjugate with each other throughout the scan range. As a result, a scanning optical apparatus system which can form a good image on the photosensitive drum (surface to be scanned 7) is obtained.

Second Embodiment

Figure 7:
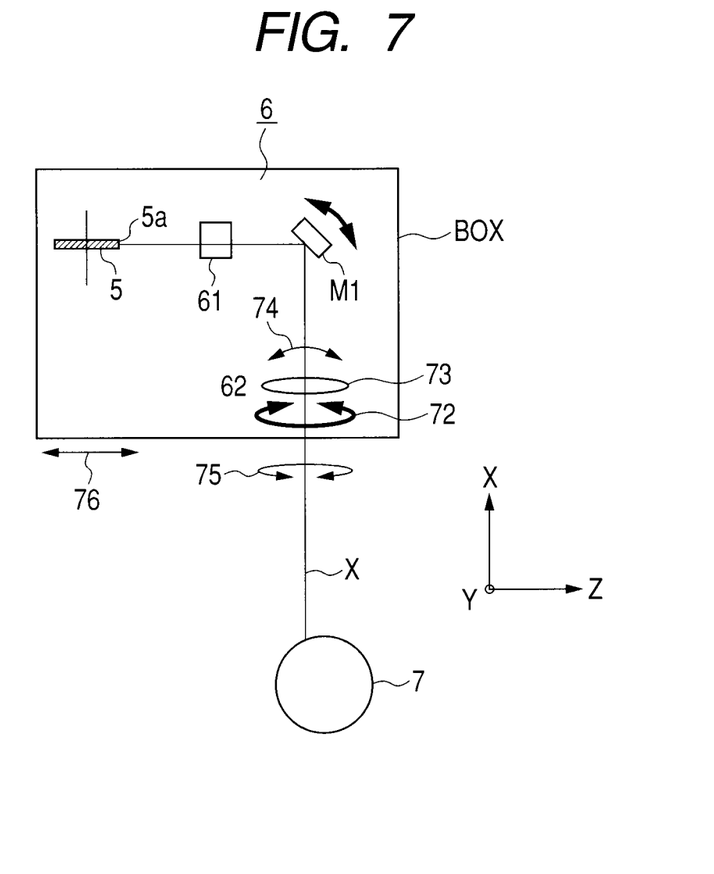
FIG. 7 illustrates an adjusting mechanism in a scanning optical apparatus according to a second embodiment of the present invention.

FIG. 7 schematically illustrates a main portion of a second embodiment regarding adjustment as a scanning optical apparatus.

An imaging optical system 6 according to this embodiment includes, between the rotational polygon mirror 5 and a surface to be scanned 7, a first imaging lens 61, a mirror M1 in a rectangular shape, and a second imaging lens 62 in a rectangular shape provided in this order from a rotational polygon mirror 5 side. In the imaging optical system 6, a deflection surface 5a of the rotational polygon mirror 5 and the surface to be scanned 7 are brought into a conjugate relationship with each other within a sub scanning section.

The second imaging lens 62 has a surface formed into an aspherical shape in the sub scanning section.

At least one of the second imaging lens 62 and the mirror M1 is held by a holding member to be movable.

By an adjusting mechanism, the mirror M1 is rotatable around an axis parallel to a main scanning direction, and the second imaging lens 62 is rotatable around an optical axis.

In positions of at least two places or more separated from each other in a longitudinal direction of at least one of the members movable to adjust, i.e., the second imaging lens 62 and the mirror M1, detection elements are disposed to detect a position of an incident light flux.

Then, a position of the movable member is adjusted based on output signals from the detection elements.

In other words, at least one of the positions of the mirror M1 and the second imaging lens 62 is adjusted. In this case, the position is adjusted so that a principle light ray incident on the imaging lens 62 coincides with a meridional line of the imaging lens 62 throughout all the area of the imaging lens 62 in the longitudinal direction.

The second embodiment is different from the first embodiment in that the movable or rotatable mirror M1 is disposed between the imaging lenses 61 and 62.

In FIG. 7, in place of the adjusting mechanism 71 of FIG. 6, the mirror M1 is rotated around a Y axis. A height of a light for scanning a lens surface of the second imaging lens 62 in the sub scanning direction (Z axis direction) is adjusted to coincide with a center of the second imaging lens 62. The adjusting mechanisms 72, 73, 74, 75, and 76 are similar to the adjusting mechanisms of FIG. 6.

Each of the aforementioned embodiments has been described by way of example of an optical system, in which at least one surface of the imaging lens within the sub scanning section has an aspherical shape, thereby correcting a surface tilt of the deflection surface at all the image heights. The case where the positional shifting of the light ray for scanning on the lens surface of the imaging lens causes conspicuous spot deterioration has been described.

The effect of suppressing the spot deterioration by aligning the scanning light on the lens surface of the imaging lens with the position of the imaging lens, by the adjusting mechanisms illustrated in FIGS. 4 and 5, is effective even when the sub scanning section of the imaging lens is spherical.

In the adjusting mechanism of the present invention, the sub scanning section is not limited to the aspherical shape. Similar effects can be obtained even when the sub scanning section is spherical.

As described above, according to the present invention, breakage of the spot shape of the light flux can be effectively suppressed, which is otherwise caused by light-ray height shifting of the light flux incident on the imaging optical system when the deflection surface and the surface to be scanned are made conjugate with each other throughout the scan range. As a result, a scanning optical apparatus capable of forming a good image can be obtained.

According to the present invention, the non-arced imaging lens having the sagittal surface in an aspherical shape is adjusted to be movable so that a ray height and a tile of the light flux incident on the imaging lens substantially coincide with the meridional line shape of the imagine lens, to thereby cause the incident light flux to enter the sagittal surface substantially symmetrically. As a result, deterioration of the spot shape of the light flux can be suppressed.

When the sagittal surface of the imaging lens is in an arced shape, shifting in height and tilt of the incident light ray with respect to the imaging lens causes shifting in spot shape of the light flux. However, performing adjustment according to the present invention enables suppression of spot diameter deterioration of the light flux.

Figure 13:
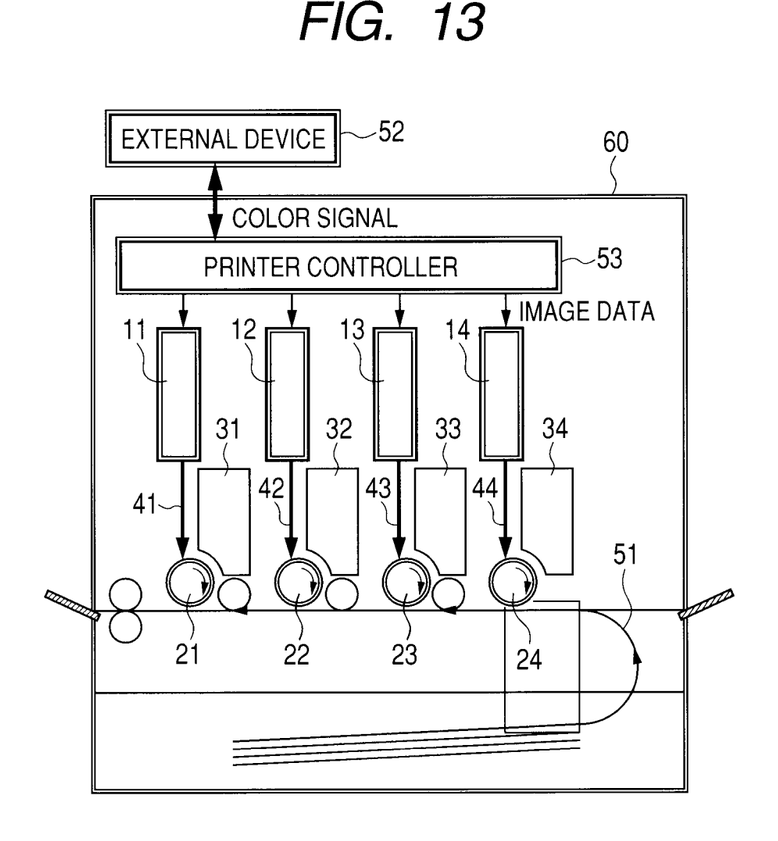
FIG. 13 illustrates a color image forming apparatus of the present invention.

FIG. 13 is a schematic diagram illustrating a main portion of a color image forming apparatus according to an embodiment of the present invention. The color image forming apparatus of this embodiment is of tandem type, which has four scanning optical apparatuses arranged side by side to record concurrently image information on surfaces of photosensitive drums, which serve as image bearing members.

FIG. 13 illustrates the color image forming apparatus 60, the scanning optical apparatuses 11, 12, 13, and 14 structured as illustrated in any one of the first and second embodiments, photosensitive drums 21, 22, 23, and 24 serving as image bearing members, developing devices 31, 32, 33, and 34, and a conveyor belt 51.

In FIG. 13, respective color signals of red (R), green (G), and blue (B) are input from an external device 52 such as a personal computer, to the color image forming apparatus 60. The color signals are converted into pieces of image data (dot data) of cyan (C), magenta (M), yellow (Y), and black (B) by a printer controller 53 in the color image forming apparatus.

The respective pieces of image data are input to the scanning optical apparatuses 11, 12, 13, and 14. Light beams 41, 42, 43, and 44, which are modulated according to the respective pieces of image data, are emitted from the scanning optical apparatuses 11, 12, 13, and 14. The photosensitive surfaces of the photosensitive drums 21, 22, 23, and 24 are scanned with the light beams in a main scanning direction.

In the color image forming apparatus of this embodiment, the four scanning optical apparatuses 11, 12, 13, and 14 are arranged side by side, each corresponding to the respective colors of cyan (C), magenta (M), yellow (Y), and black (B). The four scanning optical apparatuses concurrently record the image signals (image information) on the surfaces of the photosensitive drums 21, 22, 23, and 24, and print a color image at high speed.

As described above, the color image forming apparatus in this embodiment uses light beams, which are respectively based on image data and emitted from the four scanning optical apparatuses 11, 12, 13, and 14, to form latent images of four colors on the photosensitive drums 21, 22, 23, and 24, respectively, the photosensitive drums being associated with the four colors. The latent images are then transferred to a recording material one on another through multilayer transfer to form one full color image.

The external device 52 may be, for example, a color image reading device including a CCD sensor. In this case, the color image reading device and the color image forming apparatus 60 constitute a color digital copying machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-267220, filed Oct. 16, 2008, which is hereby incorporated by reference herein in its entirety.

What is claimed is:

1. A scanning optical apparatus comprising:
a light source unit;
a rotational polygon mirror having a plurality of deflection surfaces configured to deflectively scan a light flux emerged from the light source unit;
an incident optical system configured to image the light flux emerged from the light source unit, as a line image elongated in a main scanning direction on the deflection surfaces of the rotational polygon mirror; and
an imaging optical system which includes at least one imaging lens and is configured to image the light flux deflectively scanned by the rotational polygon mirror on a surface to be scanned and to bring the deflection surfaces of the rotational polygon mirror and the surface to be scanned into a conjugate relationship with each other in a sub scanning section,
wherein:
the imaging lens has a lens surface formed into a non-arced shape in the sub scanning section;
the non-arced shape comprises a non-arced shape including an aspherical coefficient of fourth or higher order, and the aspherical coefficient of fourth or higher order changes in the main scanning direction of the imaging optical system from a center portion to a peripheral portion of the imaging optical system;
the imaging lens is movable in at least one of shifting in a sub scanning direction and a rotational direction around an optical axis of the imaging optical system; and
the imaging lens is adjusted so that the light flux deflectively scanned by the rotational polygon mirror passes through a meridional line of the imaging lens throughout all area of the imaging lens in the longitudinal direction.

2. A scanning optical apparatus comprising:
a light source unit;
a rotational polygon mirror having a plurality of deflection surfaces configured to deflect a light flux emerged from the light source unit;
an incident optical system configured to image the light flux emerged from the light source unit, as a line image elongated in a main scanning direction in the deflection surfaces of the rotational polygon mirror; and
an imaging optical system configured to image the light flux deflectively scanned by the rotational polygon mirror on a surface to be scanned and to bring the deflection surfaces of the rotational polygon mirror and the surface to be scanned into a conjugate relationship with each other in a sub scanning section,
wherein:
the imaging optical system includes, in an optical path between the rotational polygon mirror and the surface to be scanned, a first imaging lens, a mirror, and a second imaging lens in order from the rotational polygon mirror side;
the second imaging lens has a lens surface formed into a non-arced shape in the sub scanning section;
the non-arced shape comprises a non-arced shape including an aspherical coefficient of fourth or higher order, and the aspherical coefficient of fourth or higher order changes in the main scanning direction of the imaging optical system from a center portion to a peripheral portion of the imaging optical system;
the mirror is rotatable around an axis parallel to the main scanning direction; and
the imaging lens is adjusted so that the light flux deflectively scanned by the rotational polygon mirror passes through a meridional line of the second imaging lens throughout all area of the imaging lens in the longitudinal direction.

3. A scanning optical apparatus comprising:
a light source unit;
a rotational polygon mirror having a plurality of deflection surfaces configured to deflect a light flux emerged from the light source unit;
an incident optical system configured to image the light flux emerged from the light source unit, as a line image elongated in a main scanning direction in the deflection surfaces of the rotational polygon mirror; and
an imaging optical system configured to image the light flux deflectively scanned by the rotational polygon mirror on a surface to be scanned and to bring the deflection surfaces of the rotational polygon mirror and the surface to be scanned into a conjugate relationship with each other in a sub scanning section, wherein:
the imaging optical system includes, in an optical path between the rotational polygon mirror and the surface to be scanned, a first imaging lens, a mirror, and a second imaging lens in order from the polygonal mirror side;
the second imaging lens has a lens surface formed into a non-arced shape in the sub scanning section;
the non-arced shape comprises a non-arced shape including an aspherical coefficient of fourth or higher order, and the aspherical coefficient of fourth or higher order changes in the main scanning direction of the imaging optical system from a center portion to a peripheral portion of the imaging optical system;
the second imaging lens is rotatable around an optical axis of the imaging optical system; and
the imaging lens is adjusted so that the light flux deflectively scanned by the rotational polygon mirror passes through a meridional line of the second imaging lens throughout all area of the imaging lens in the longitudinal direction.

4. A scanning optical apparatus according to claim 1, wherein the imaging lens has a rectangular shape longitudinal in the main scanning direction, and the scanning optical apparatus includes detection elements disposed in positions of at least two or more places separated from each other in a longitudinal direction of the imaging lens to detect a position of an incident light flux, and an adjusting mechanism capable of rotating the imaging lens around the optical axis of the imaging optical system based on output signals from the detection elements.

5. A scanning optical apparatus according to claim 2, wherein the mirror has a rectangular shape longitudinal in the main scanning direction, and the scanning optical apparatus includes detection elements disposed in positions of at least two or more places separated from each other in a longitudinal direction of the second imaging lens to detect a position of an incident light flux, and an adjusting mechanism capable of rotating the mirror around an axis parallel to the main scanning direction based on output signals from the detection elements.

6. A scanning optical apparatus according to claim 3, wherein the second imaging lens has a rectangular shape longitudinal in the main scanning direction, and the scanning optical apparatus includes detection elements disposed in positions of at least two or more places separated from each other in a longitudinal direction of the second imaging lens to detect a position of an incident light flux, and an adjusting mechanism capable of rotating the second imaging lens around an optical axis of the imaging optical system based on output signals from the detection elements.

7. An image forming apparatus comprising:
a scanning optical apparatus comprising:
 a light source unit;
 a rotational polygon mirror having a plurality of deflection surfaces configured to deflectively scan a light flux emerged from the light source unit;
 an incident optical system configured to image the light flux emerged from the light source unit, as a line image elongated in a main scanning direction on the deflection surfaces of the rotational polygon mirror; and
 an imaging optical system which includes at least one imaging lens and is configured to image the light flux deflectively scanned by the rotational polygon mirror on a surface to be scanned and to bring the deflection surfaces of the rotational polygon mirror and the surface to be scanned into a conjugate relationship with each other in a sub scanning section,
 wherein:
 the imaging lens has a lens surface formed into a non-arced shape in the sub scanning section;
 the non-arced shape comprises a non-arced shape including an aspherical coefficient of fourth or higher order, and the aspherical coefficient of fourth or higher order changes in the main scanning direction of the imaging optical system from a center portion to a peripheral portion of the imaging optical system;
 the imaging lens is movable in at least one of shifting in a sub scanning direction and a rotational direction around an optical axis of the imaging optical system; and
 the imaging lens is adjusted so that the light flux deflectively scanned by the rotational polygon mirror passes through a meridional line of the imaging lens throughout all area of the imaging lens in the longitudinal direction;
a photosensitive member disposed on the surface to be scanned;
a developing device configured to develop an electrostatic latent image formed on the photosensitive member with a light flux scanned by the scanning optical apparatus, as a toner image;
a transferring device configured to transfer the developed toner image to a transfer material; and
a fixing device configured to fix the transferred toner image on the transfer material.

8. An image forming apparatus according to claim 7, further comprising a print controller configured to convert code data supplied from an external device, into an image signal and to input the image signal to the scanning optical apparatus.

9. An image forming apparatus comprising:
the scanning optical apparatus according to claim 2;
a photosensitive member disposed on the surface to be scanned;
a developing device configured to develop an electrostatic latent image formed on the photosensitive member with a light flux scanned by the scanning optical apparatus, as a toner image;
a transferring device configured to transfer the developed toner image to a transfer material; and
a fixing device configured to fix the transferred toner image on the transfer material.

10. An image forming apparatus according to claim 9, further comprising a print controller configured to convert code data supplied from an external device, into an image signal and to input the image signal to the scanning optical apparatus.

11. An image forming apparatus comprising:
the scanning optical apparatus according to claim 3;
a photosensitive member disposed on the surface to be scanned;
a developing device configured to develop an electrostatic latent image formed on the photosensitive member with a light flux scanned by the scanning optical apparatus, as a toner image;
a transferring device configured to transfer the developed toner image to a transfer material; and
a fixing device configured to fix the transferred toner image on the transfer material.

12. An image forming apparatus comprising: the scanning according to claim 11, further comprising a print controller configured to convert code data supplied from an external device, into an image signal and to input the image signal to the scanning optical apparatus.

13. A scanning optical apparatus according to claim 6, wherein the mirror is rotatable around an axis parallel to the main scanning direction, and the adjusting mechanism is capable of rotating the mirror around the axis parallel to the main scanning direction based on output signals from the detection elements.

14. A scanning optical apparatus according to claim 2, wherein the second imaging lens is rotatable around an optical axis of the imaging optical system.

* * * * *